(12) United States Patent
Barozzi et al.

(10) Patent No.: US 10,207,311 B2
(45) Date of Patent: Feb. 19, 2019

(54) MACHINE FOR THE PRODUCTION OF COILED GASKETS

(71) Applicant: GSKET S.R.L., Crema (IT)

(72) Inventors: Gian Piero Barozzi, Crema (IT); Lorenzo Facchinetti, Crema (IT)

(73) Assignee: GSKET S.R.L., Crema (CR) (IT)

( * ) Notice: Subject to any disclaimer, the term of this patent is extended or adjusted under 35 U.S.C. 154(b) by 0 days.

(21) Appl. No.: 15/711,081

(22) Filed: Sep. 21, 2017

(65) Prior Publication Data

US 2018/0085817 A1    Mar. 29, 2018

(30) Foreign Application Priority Data

Sep. 23, 2016  (IT) .......................... 102016000095770

(51) Int. Cl.
| | |
|---|---|
| *B21D 53/16* | (2006.01) |
| *B23K 26/21* | (2014.01) |
| *B23P 23/04* | (2006.01) |
| *B23P 21/00* | (2006.01) |
| *B65H 81/02* | (2006.01) |
| *B21D 53/18* | (2006.01) |
| *B23P 15/00* | (2006.01) |

(Continued)

(52) U.S. Cl.
CPC .............. *B21D 53/18* (2013.01); *B21D 11/06* (2013.01); *B23K 26/0093* (2013.01); *B23P 15/00* (2013.01); *B23P 23/04* (2013.01); *B65H 81/06* (2013.01); *F16J 15/125* (2013.01); *Y10T 29/5145* (2015.01); *Y10T 29/5197* (2015.01)

(58) Field of Classification Search
CPC ............. Y10T 29/5143; Y10T 29/5145; Y10T 29/5197; Y10T 29/5198
USPC .......................... 29/564.7, 564.8, 33 Q, 33 S
See application file for complete search history.

(56) References Cited

U.S. PATENT DOCUMENTS

| | | | | |
|---|---|---|---|---|
| 2,475,856 | A * | 7/1949 | Price ...................... | B65H 81/06 |
| | | | | 242/437.3 |
| 2,579,858 | A * | 12/1951 | Price ...................... | B21C 47/06 |
| | | | | 72/128 |

(Continued)

FOREIGN PATENT DOCUMENTS

| | | | |
|---|---|---|---|
| CH | 602214 A | * | 7/1978 |
| CN | 203955791 U | | 11/2014 |

(Continued)

*Primary Examiner* — Erica E Cadugan

(57) ABSTRACT

Machine (10) for the production of coiled gaskets from continuous strips, i.e. a master backing strip (1a) and sealing filler strip (1b), to be spirally wound onto rings, templates or inner rings (11), comprising at least: means (2) for feeding the strips (1a,1b) to be wound, a unit (100) for straightening and forming the backing strip (1a), a unit (200) for making incisions in and cutting the backing strip (1a), arranged downstream of the forming unit (100), a unit (300) for joining together the master strip (1a) and filler strip (1b) so as to form a combined strip (1) and cutting the filler strip (1b), a rotating spindle unit (400) for winding the combined strip (1), arranged downstream of the strip joining unit (300); a unit (500) for driving the ring or inner-ring (11) arranged downstream of the spindle (400), and a unit (600) for welding the master strip (1a), said units being designed to be able to produce automatically and in sequence a finished gasket, in accordance with a program managed by means (1000) for programming, controlling and actuating the operations.

14 Claims, 8 Drawing Sheets

(51) Int. Cl.
*B23K 26/00* (2014.01)
*B21D 11/06* (2006.01)
*B65H 81/06* (2006.01)
*F16J 15/12* (2006.01)

(56) References Cited

U.S. PATENT DOCUMENTS

| | | | | |
|---|---|---|---|---|
| 3,484,576 | A * | 12/1969 | Foster | B21F 3/04 |
| | | | | 219/78.01 |
| 3,905,090 | A * | 9/1975 | Painter | B21D 53/20 |
| | | | | 228/164 |
| 4,048,829 | A * | 9/1977 | Thomas | B65H 51/10 |
| | | | | 29/455.1 |
| 4,189,819 | A * | 2/1980 | Nicholson | F16J 15/0887 |
| | | | | 29/417 |
| 4,781,048 | A * | 11/1988 | Richardson | F16J 15/125 |
| | | | | 72/146 |
| 5,485,665 | A * | 1/1996 | Marks | B65H 81/06 |
| | | | | 242/413.1 |
| 6,195,867 | B1 * | 3/2001 | Hashiguchi | B21D 11/06 |
| | | | | 242/584.1 |
| 6,665,925 | B1 * | 12/2003 | Suggs | B21D 11/06 |
| | | | | 29/33 K |
| 6,823,579 | B2 * | 11/2004 | Veiga | B65H 18/28 |
| | | | | 29/33 D |
| 7,097,179 | B1 * | 8/2006 | Suggs | B21D 11/06 |
| | | | | 277/610 |
| 9,346,133 | B2 * | 5/2016 | Barozzi | B23K 11/061 |

FOREIGN PATENT DOCUMENTS

| | | |
|---|---|---|
| EP | 0707906 A1 | 4/1996 |
| JP | 2000-145966 A * | 5/2000 |
| KR | 101273079 B1 | 6/2013 |

* cited by examiner

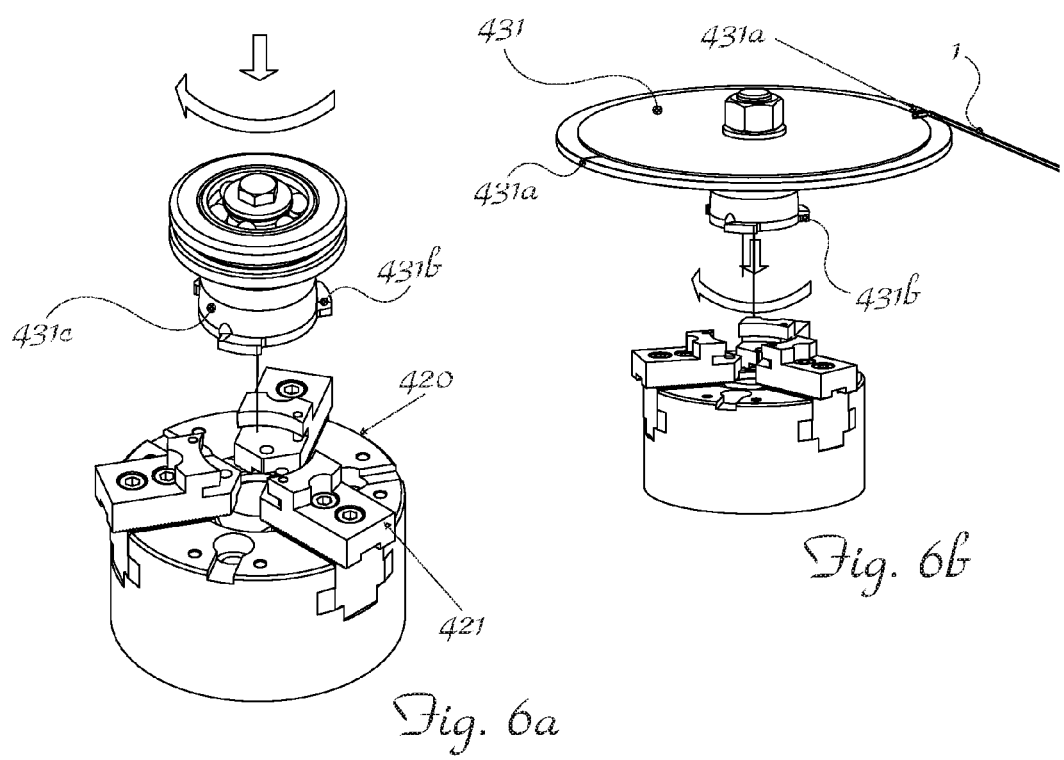
Fig. 6a
Fig. 6b
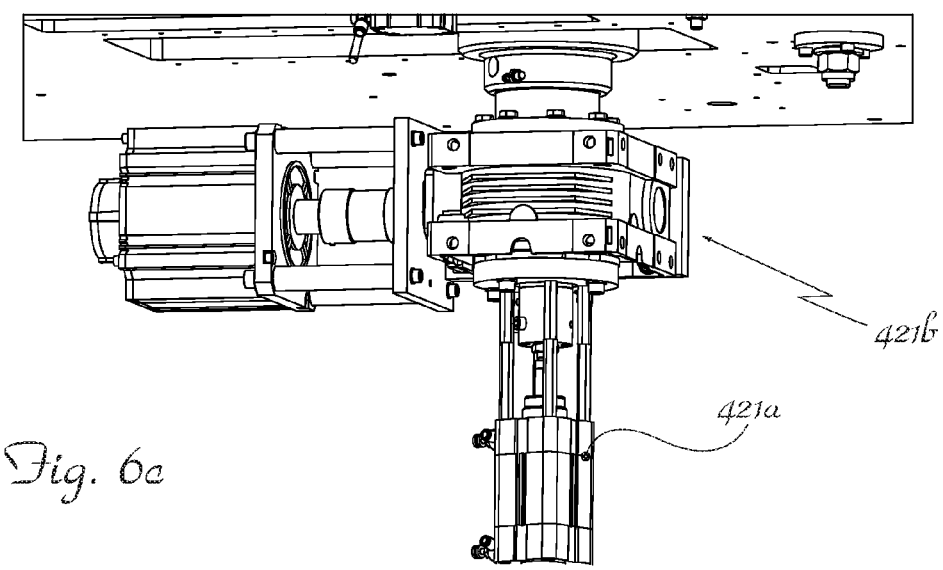
Fig. 6c

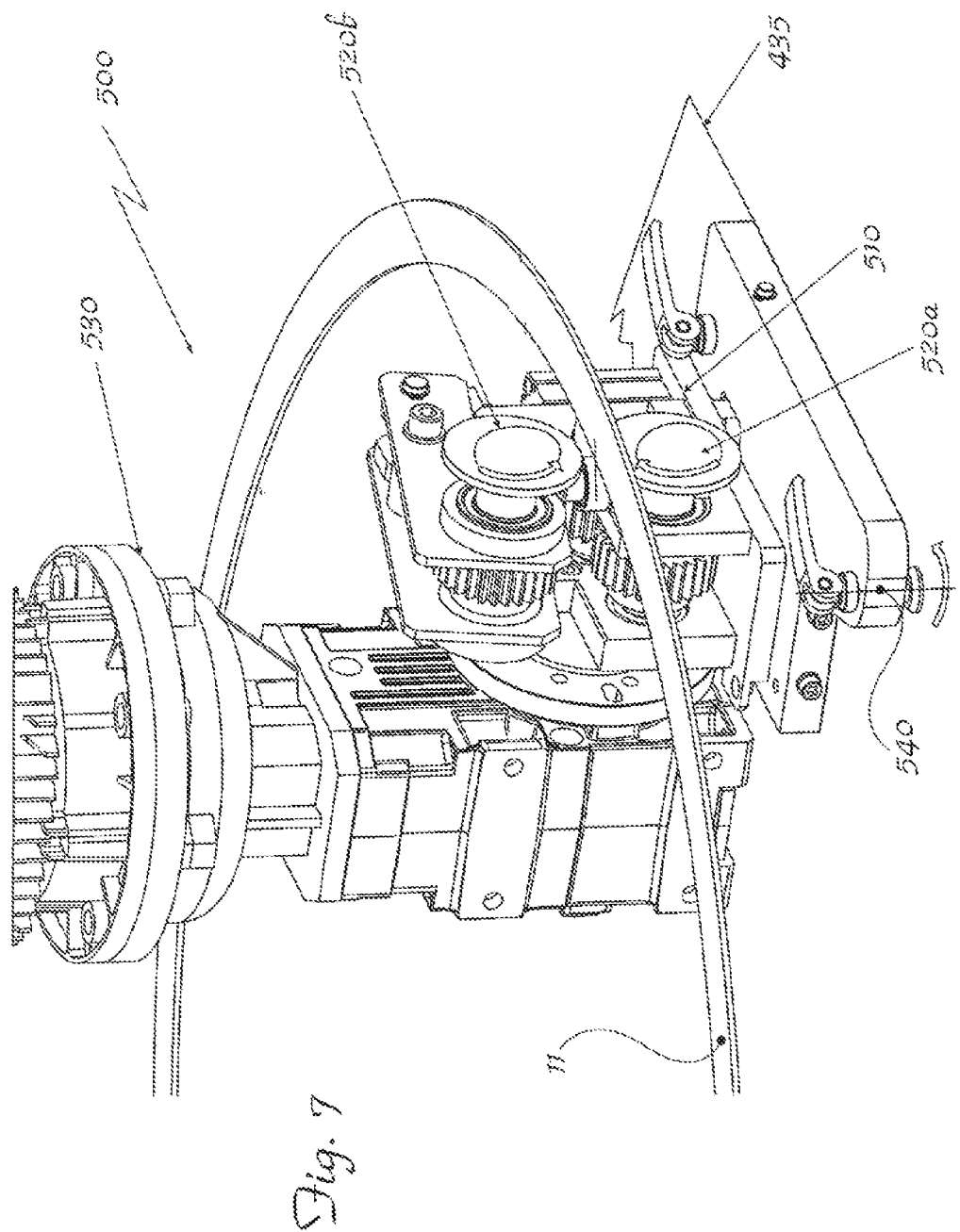

MACHINE FOR THE PRODUCTION OF COILED GASKETS

TECHNICAL FIELD

The present invention relates to a machine for the production of coiled gaskets.

BACKGROUND

In the art numerous types of sealing gaskets produced in the form of rings and designed to perform static frontal sealing, for example of pipe connections, are known. It is also known that for the industrial production of these types of gaskets it is necessary to wind up in a spiral two strips which are superimposed on each other and have physical and mechanical characteristics which are very different from each other, in particular a first strip with a high mechanical strength, for example made of steel, which forms the backing for the second strip made of a material having high insulating and sealing characteristics, but a smaller mechanical strength.

Also known are machines which perform the construction of said gaskets either semi-manually, this requiring constant monitoring and auxiliary action on the part of an operator fully overseeing the machine, or semi-automatically, as illustrated in EP 0,707,906, this document describing an automatic machine for the production of gaskets obtained by spirally winding strips with different physical and mechanical characteristics onto a support ring, which machine comprises means for feeding said support rings to a spindle, means for feeding the strips to be wound to the support ring, a unit for applying radial pressure on said rings and a unit for welding one of said strips for starting winding and for closing the gasket once winding has been completed.

The known machine has in particular a tool-holder spindle which cannot be displaced along the plane perpendicular to the tool so as to adapt to the increase in diameter of the gasket during winding of the strip; on the contrary, the entire feeding unit must be manually displaced in order to adapt it to the different dimensions of the gaskets. Similar machines according to the preamble of claim 1 are described in CN 203 955 791 and KR 101 273 079.

Although performing their function, these known machines have, however, a number of drawbacks arising from the fact that they are unable to produce automatically, and without long machine downtime needed for retooling thereof, gaskets with diametral dimensions varying between a few tens of mm and four meters.

BRIEF SUMMARY

The technical problem which is posed therefore is that of providing a machine which provides a solution to the aforementioned problems of the prior art.

In connection with this problem it is also required that the machine should be able to use backing strips which are both pre-formed and flat and to produce gaskets wound onto disks, from which they are automatically separated and removed by the operator, or onto rings from which they are separated manually or onto inner rings of the said gasket to which the front end of the backing strip is welded and the gasket then wound.

These results are obtained according to the present invention by a machine for the production of coiled gaskets according to the characteristic features of claim 1.

BRIEF DESCRIPTION OF THE DRAWINGS

Further details may be obtained from the following description of a non-limiting example of embodiment of the subject of the present invention, provided with reference to the accompanying drawings, in which:

FIG. 6a: shows a partially exploded perspective view of the spindle;

FIG. 6b: shows a view similar to that of FIG. 6a with winding disk mounted on the spindle;

FIG. 6c: shows a perspective view of the means for rotationally operating the spindle;

FIG. 7: shows a perspective view of the unit for driving the combined strip.

DETAILED DESCRIPTION

Figure 1:
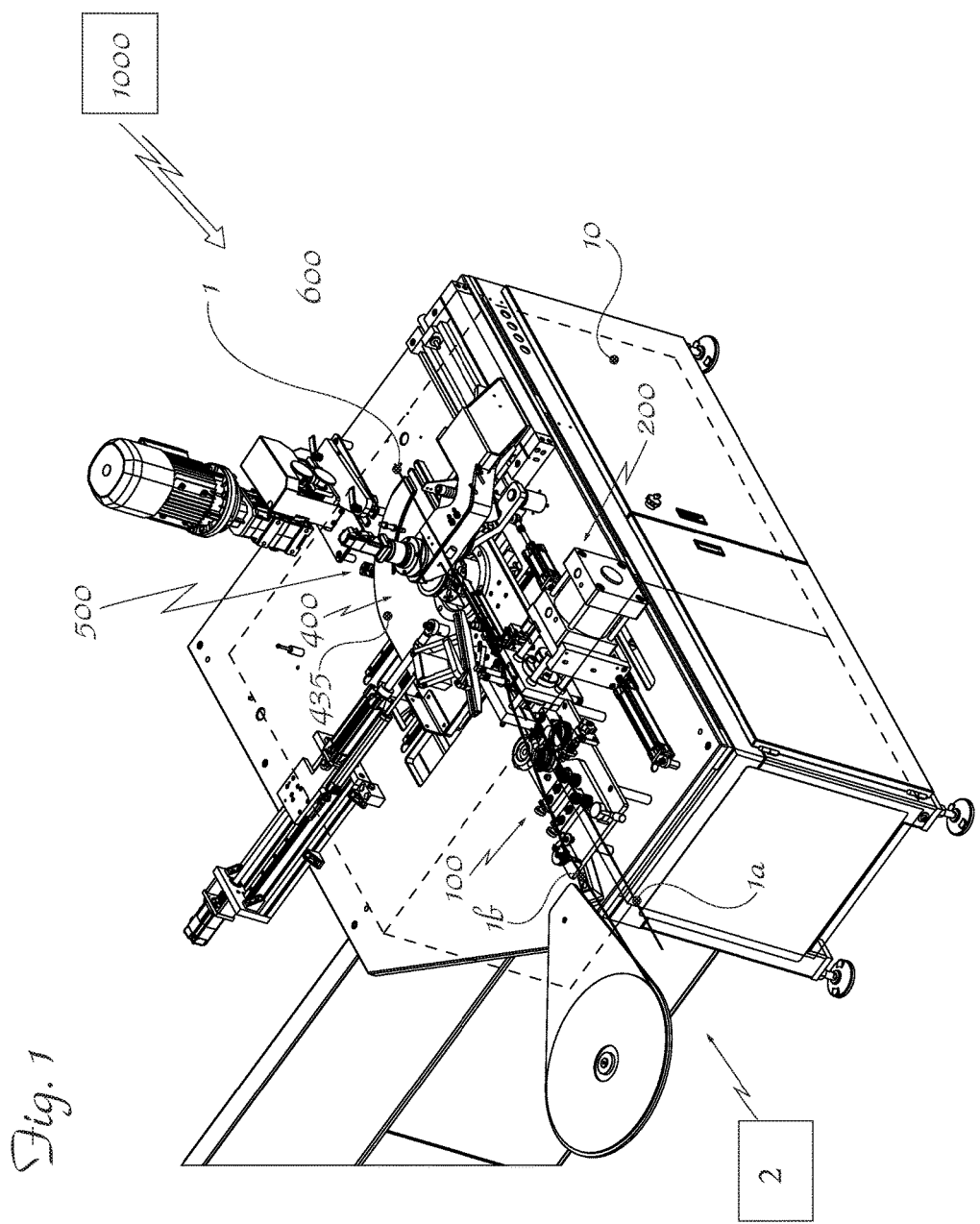
FIG. 1: shows a perspective view of an example of embodiment of the coiling machine according to the present invention.
Figure 2:
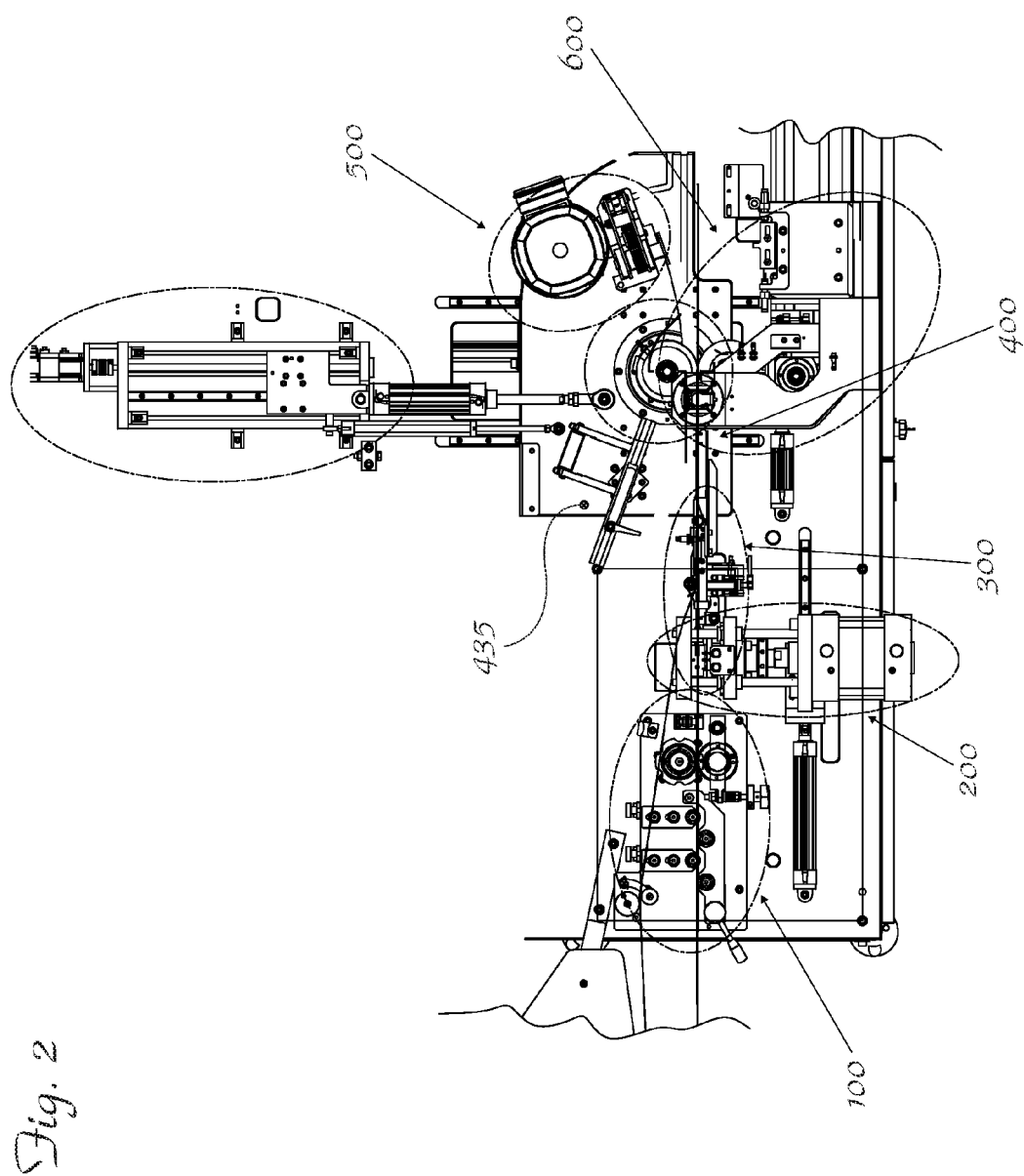
FIG. 2: shows a top plan view of the machine according to FIG. 1 with the various operating units highlighted by broken-line circles.

As shown a set of three reference axes will be assumed solely for easier description and without a limiting meaning, said axes having the following directions: a longitudinal direction X-X corresponding to the direction of extension and feeding of the strip inside the machine; a transverse direction Y-Y orthogonal to the longitudinal direction; a vertical direction Z-Z orthogonal to the other two directions, and a front part or upstream part corresponding to the side where the strip enters into the machine and a rear part or downstream part opposite to the front part. For the purposes of the present description the following are also defined:

- a backing strip 1a (FIG. 1) made of material with a high mechanical strength, such as steel, referred to below also for the sake of brevity as "master";
- a sealing strip 1b (FIG. 1) made of material with high insulating and sealing characteristics, but with a smaller mechanical strength, also referred to below by the term "filler";
- a strip 1 (FIG. 1) formed by joining together of the backing strip 1a and the sealing strip 1b;
- means (2) external to the machine—not shown nor described in detail—for separately feeding the two strips, i.e. backing strip 1a and sealing strip 1b—to the coiling machine;
- means external to the machine, for programming, controlling and actuating the various working phases and moving parts of the machine, indicated only schematically by means of 1000 and not described in detail.

Based on the above definitions, the coiling machine according to the present invention described below comprises essentially (FIG. 1,2): a base 10 on which the following are mounted:
- a unit 100 for straightening and forming the backing strip 1a;
- a unit 200 for making incisions in and cutting the backing strip 1a;
- a unit 300 for joining together the strips, master 1a and filler 1b, with associated die for cutting the filler strip 1b;
- a spindle unit 400 for winding the combined strip 1;
- a unit 500 for driving the combined strip 1;
- a laser welding unit 600.

Figure 3:
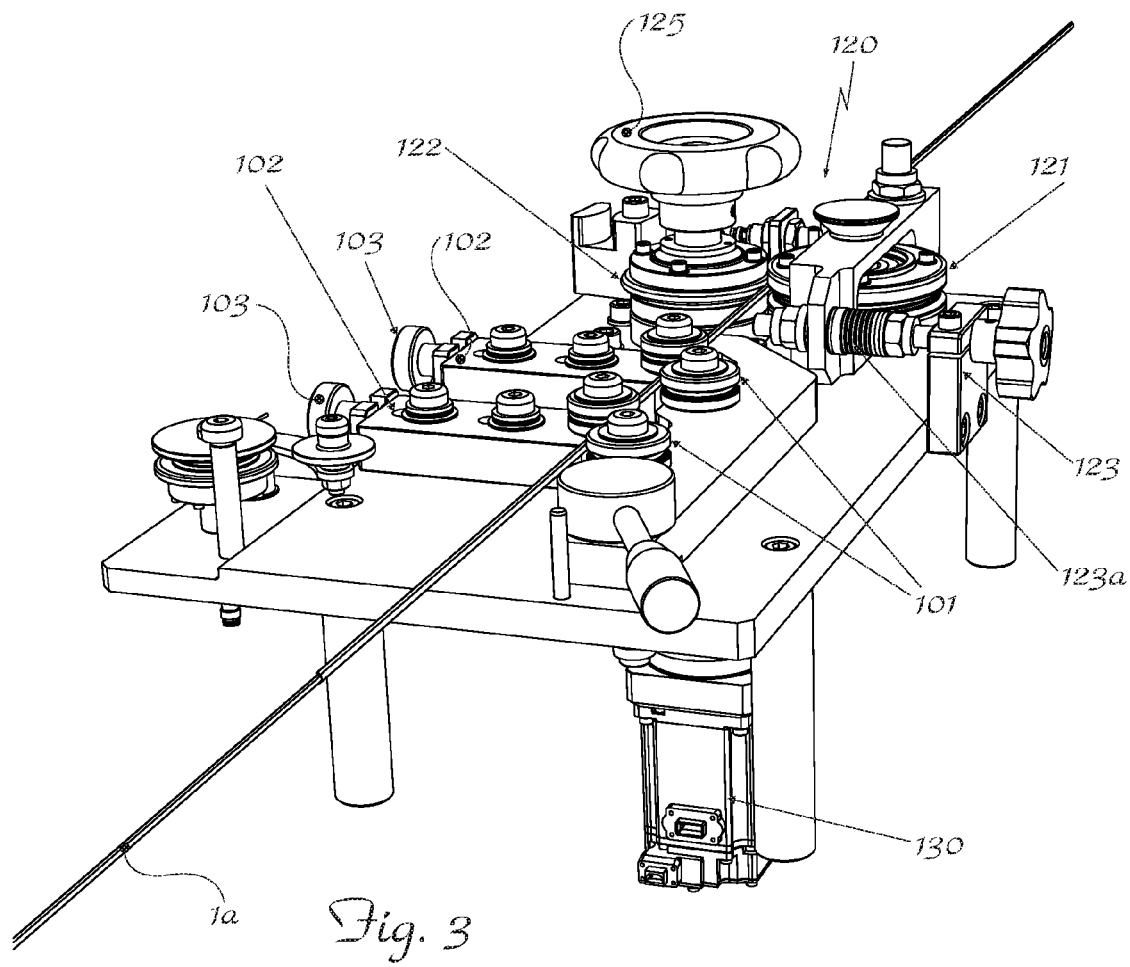
FIG. 3: shows a perspective view of the unit for straightening and forming the backing strip.
Figure 3A:
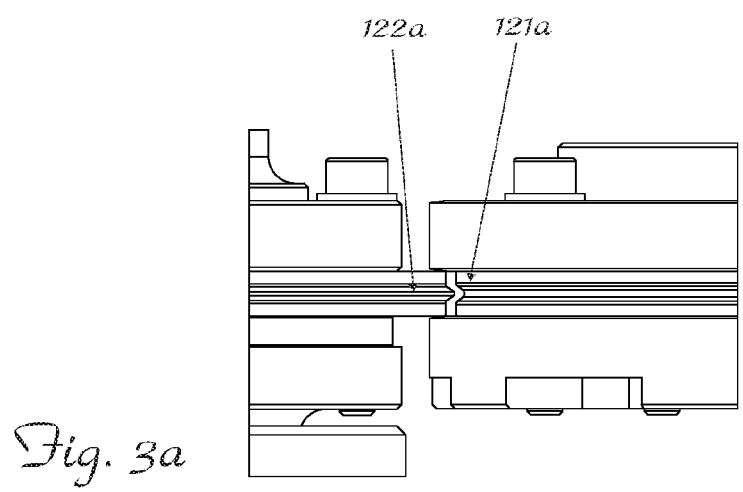
FIG. 3a: shows a schematic vertically sectioned view of the forming disks.

In greater detail and according to preferred embodiments:

The unit 100 for straightening and forming the backing strip comprises (FIG. 3):
- A plurality of vertical-axis pulleys 101 arranged parallel to the longitudinal direction X-X and suitably staggered relative to each other in the transverse direction Y-Y so as to be arranged alternately on opposite sides of the backing strip 1a for guiding and straightening it during its feeding movement inside the machine; the pulleys are mounted on respective support blocks 102 which are movable upon operation of means 103, for example of the screw type, for adjusting the relative position depending on the characteristics of the strip 1a.
- A pair 120 of forming disks comprising a first idle roller 121 and a second roller 122 motor-driven by means of an NC motor, said rollers being arranged on opposite sides of the strip 1a in the transverse direction Y-Y; the two disks have a respective relief 122a or recess 121a with complementary cross-section and dimensions, able to be clamped together on opposite sides of the strip so as to give it the desired form, for example a V-shaped or W-shaped form; the two disks are fixed to associated supports, one of which 123 is movable, said supports being designed to allow the adjustment of the relative interaxial distance depending on the characteristics of the steel strip 1a and provided with Belleville spring 123a for calibration.

An operating handle 125 which can be manually operated by the user is positioned on the top of the motor-driven disk 122.

Fixing of the disks 121,122 to the respective support is performed by means able to be mounted/removed so as to allow rapid changing thereof upon variation in the forming action required for the strip 1a.

According to the invention it is envisaged that the unit 100 for straightening and forming the master strip 1a also performs the following functions performed by means of a PLC-controlled brushless motor designed to generate a torque acting in both directions, i.e. clockwise or anti-clockwise direction of rotation:
- driving so as to feed the master strip after cutting and convey its front end to the winding spindle;
- adjusting the tension of the master when it is driven and wound by the spindle so as to ensure the compactness of the gasket, exerting a torque contrary to the movement of the spindle;
- measuring the length of the master 1a during winding and interruption of feeding when the pre-predefined design dimensions for production of the gaskets are achieved.

Figure 4:
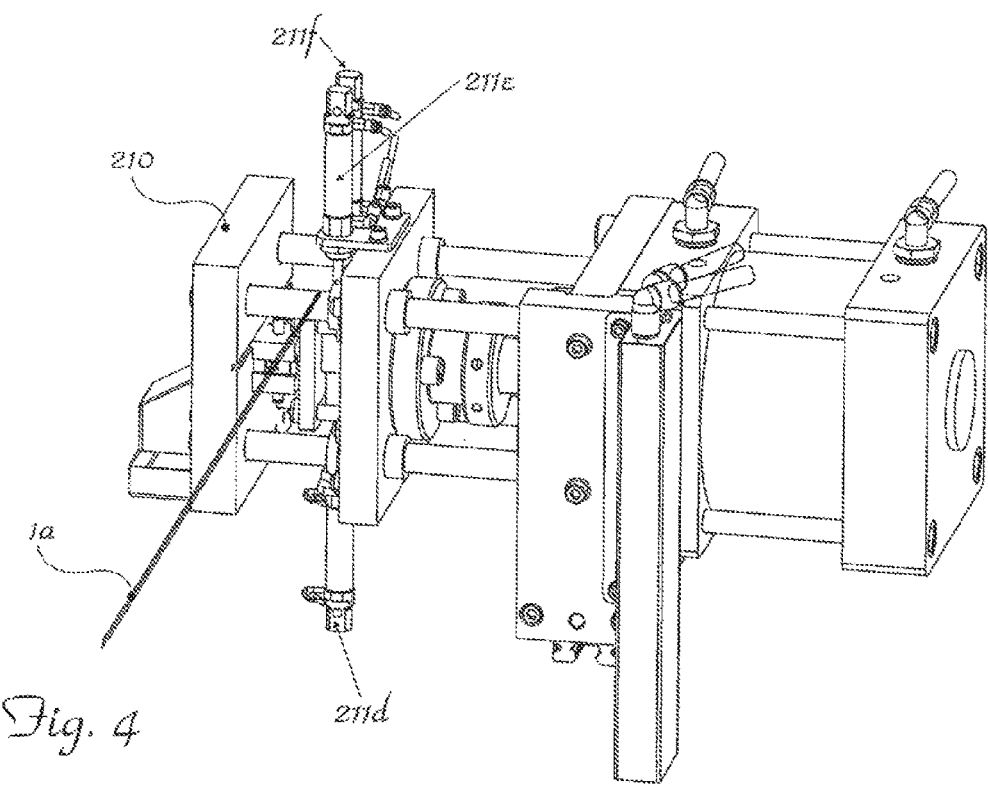
FIG. 4: shows a perspective view of the unit for making incisions in and cutting the backing strip.
Figure 4A:
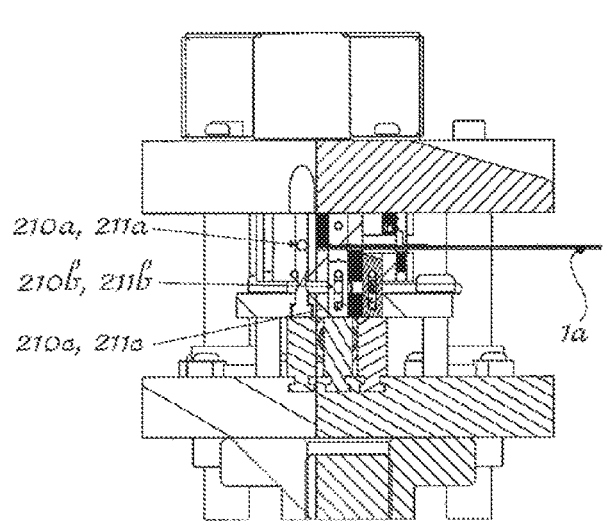
FIG. 4a: shows a vertically sectioned schematic view of the unit for making incisions in and cutting the backing strip.
Figure 4B:
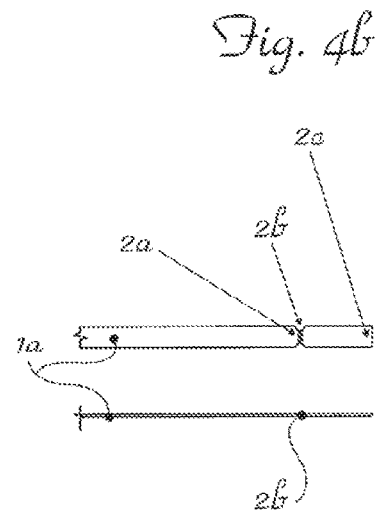
FIG. 4b: shows a schematic view of the backing strip with incisions and cut.

The unit 200 for making incisions in and cutting the backing strip 1a, which is arranged downstream of the forming unit 100, comprises (FIG. 4) a first fixed half-die 210, formed by a guide and a matrix, and a second half-die 211, movable parallel to the transverse direction Y-Y, said half-dies being designed to make the notch 2a in the edge, the incision 2b and the cut 2c in the master 1a, as shown in FIG. 4b.

Inside the half-dies it is possible to identify the complementary male and female elements 210a and 211a which form the notch 2a in the edge of the strip, the complementary elements 210b and 211b which make the incision 2b in the strip and the elements 210c and 211c which perform the cut 2c in the strip. These operations are controlled and selected by means of respective pneumatic cylinders 211d,211e,211f performing a vertical movement along the direction Z-Z by means of sliding valve actuators arranged on the movable half-die.

Figure 5:
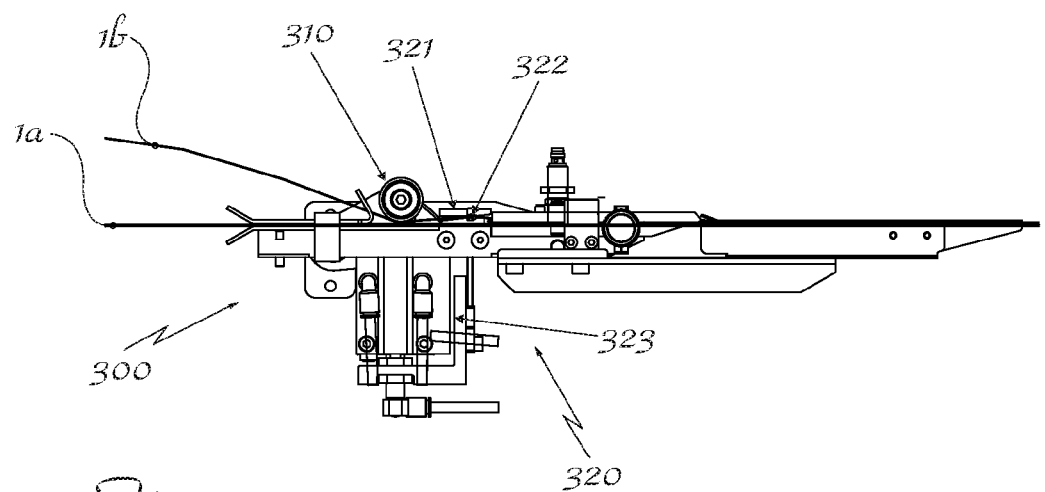
FIG. 5: shows a top plan view of the unit for joining together the filler strip and backing strip with die for cutting the filler strip.

The unit 300 (FIG. 5) for joining together master 1a and filler 1b, arranged downstream of the unit 200 for performing incisions in and cutting the backing strip 1a, comprises a bearing 310 with axis parallel to the vertical axis Z-Z movable in the transverse direction Y-Y by conventional means so as to produce a thrusting force in the same transverse direction Y-Y suitable for ensuring joining together of the two strips, i.e. filler 1b and master 1a, which from that moment on proceed towards the following stations for working the filler 1b conveyed by the master 1a to which it adheres by means of friction;

the device 320 for cutting the filler strip 1b is positioned downstream of the bearing 310 and momentarily separates the filler from the master so as to perform the cut and then join the two together again; the device has a die 321 with a blade 322 mounted on a slide 323 which can be displaced along the direction Y-Y so as to allow cutting of only the filler strip 1b without damaging the backing strip 1a.

Figure 6:
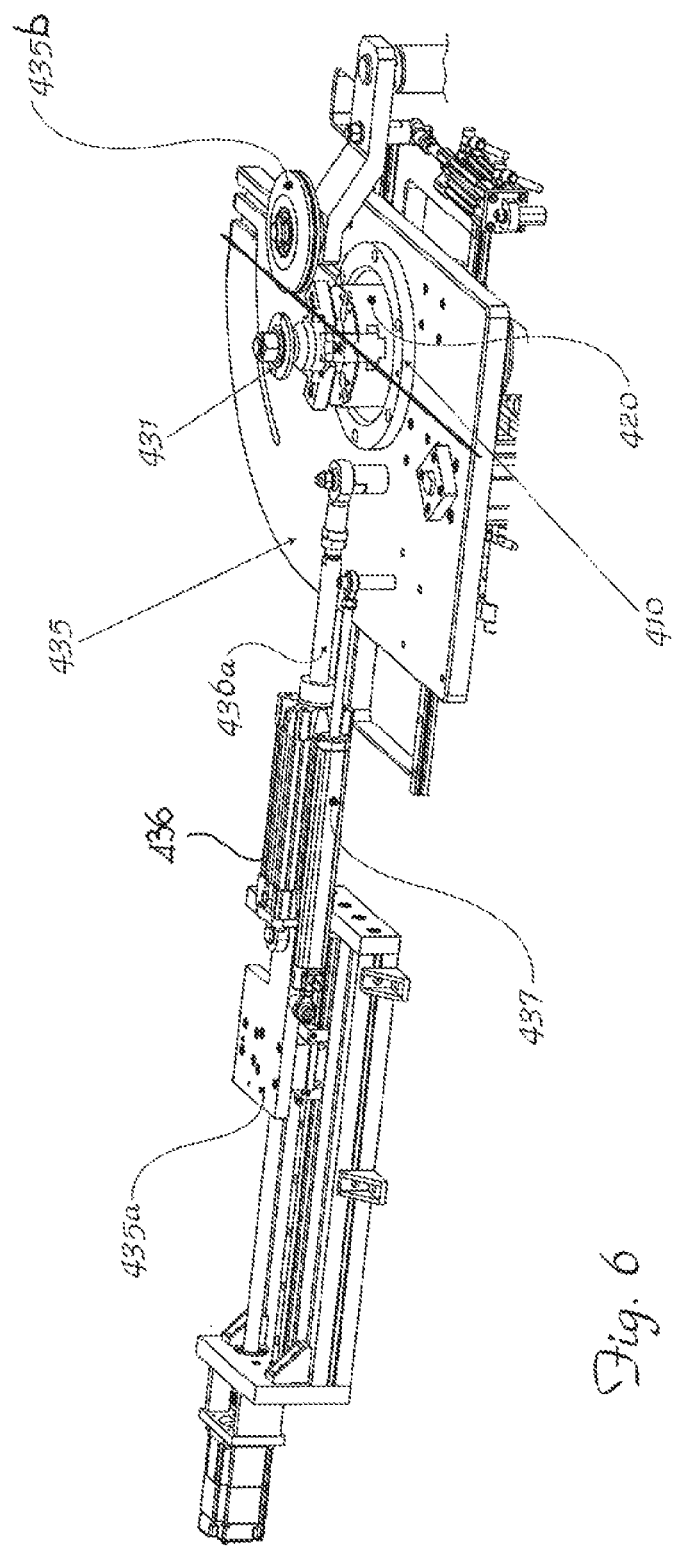
FIG. 6: shows a perspective view of the spindle unit with associated movement means.

The spindle unit 400 (FIG. 6) for winding the strip 1 is arranged downstream of the strip joining unit 300 and comprises a cylindrical vertical-axis base 410 which is attached to a device 435 for imparting movement in the transverse direction Y-Y and which has fixed thereon the free end of the rod 436A of a pressure cylinder 436 which is also transverse thereto and the sleeve of which is positioned on a slide 435a which can be displaceably actuated by means of an NC controlled drive system and is designed to displace the axis of rotation of the spindle and therefore the centre of rotation upon variation in the size of the gasket during winding thereof.

The base 410 has, positioned thereon (FIG. 6a), a device 420 with self-centering radial jaws 421 which can be actuated by an underlying cylinder 421a and are designed to retain corresponding protrusions 431b of a shank 431c having, fixed thereon, a winding disk 431 which has a radial incision 431a for inserting one end of the strip 1 to be wound. The spindle is rotationally actuated by a gearmotor 421b.

The spindle unit also comprises a vertical-axis counter-thrust roller 435b (FIG. 6) situated opposite, in the direction Y-Y, to the winding disk 431 and movable by controlled operation means, from a rest position, separated from said disk, to a working position, close to the winding disk 431, so as to ensure relative tangential contact. During formation of the spirally wound band which constitutes the gasket being formed, the pressure cylinder 436 keeps the pressure exerted by means of suitable electro-pneumatic devices constant, thus causing the gradual retraction of the stem 436a, the position of which is monitored by a linear transducer 437.

This unit therefore performs the dual function of providing the winding torque necessary for forming the coiled gaskets up to a diameter of 500 mm using the disks of varying diameter.

As an alternative to and in the case of a gasket wound onto a template or inner ring the spindle unit is designed to provide an idly rotating pressure base for forming the gaskets with a diameter greater than 500 mm and up to 4 m by means of the rings which in this case are rotated by the drive unit 500.

A drive unit 500 (FIG. 7) to be used for forming gaskets wound onto a template or an inner ring with diameter ranging from 500 mm to 4 m is arranged downstream of the spindle 440, fixed onto the device 435 for moving the said spindle and comprises a support 510 which has, fixed thereto, two transverse-axis rollers 520a,520b which are aligned with and above each other in the vertical direction Z-Z and moved rotatably by a gearmotor 530 via suitably sized gearwheels so as to engage with friction on the template or on the inner ring 11 and cause rotation thereof in the anti-clockwise direction. The bottom roller 520a is fixed, while the top roller 520b is movable and actuated by means of a pneumatic cylinder (not shown) which positions it on the inner edge of the ring or the inner ring, exerting a pressure sufficient to cause driving, by means of friction, of the winding ring or the inner ring. The unit has a fulcrum 540 on the support plate 435 of the spindle 400 so that, during use, the rotation of the drive unit 500 keeps the axis of the rollers for driving the templates or rings always radial relative to the gasket to be made so as to adapt to all the diameters ranging from 500 mm to 4 m.

Figure 8:
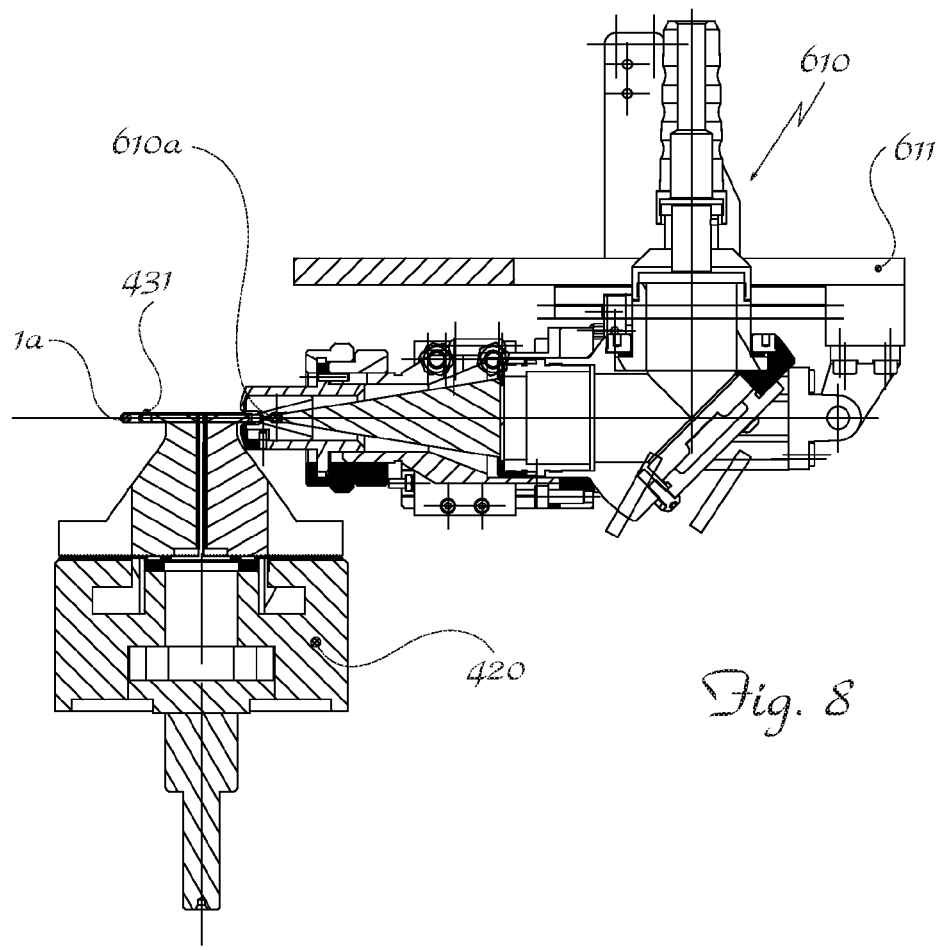
FIG. 8: shows a schematic vertically sectioned view of the laser welding unit.

The welding unit 600 (FIG. 8) comprises, in a first example of embodiment, a laser device 610 which is conventional per se and the emission head 610a of which is arranged radially with respect to the gasket being forced so as to weld, with a variable number of welds as required, the master 1a onto itself after completion of the first turn and to the tail end of the master for closing the gasket. Laser welding is particularly preferred for gaskets which are intended for the nuclear energy sector where no contamination of the welding materials such as copper and like is permitted. This laser device is mounted on a support 611 which allows displacement of the unit from the parked position to the working position and rotation of the end part of the laser so as to keep a welding position always perfectly radial with respect to the gasket being formed, adapting automatically, by means of a suitable algorithm, to the variation in diameter, this being obtained owing to the particular position of the centre of rotation associated with the particular geometry of the device.

Alternatively it is envisaged using welding grippers which are per se conventional and therefore not described in detail and are suitable for all the other uses and have a cost less than that of the laser device.

With the configuration described above it is possible to produce coiled gaskets using three methods which depend on the different diameters required for the finished gasket:

winding onto a disk fixed to the spindle, the gasket being detached from the disk once winding has been completed;
winding onto an inner ring which, once winding has been completed, remains inside the gasket;
winding onto a template, in turn consisting of a ring rotated by the drive unit arranged downstream of the spindle 400 on which the template usually rests.

In detail, the operating principle of the machine is as follows:
A) Winding onto a Disk
  the means for performing feeding of the two strips, i.e. backing strip or master 1a and sealing strip or filler 1b, are prepared;
  the winding disk 431 is selected depending on the size of the gasket to be produced and is attached to the spindle 400;
  the end of the backing strip 1a is inserted between the straightening rollers 101 and, by operation of the manually operated handle 125 of the forming roller 122, it is introduced into the fixed incision and cutting half-die 210 in order to prepare the front gasket end for insertion inside the notch 431a of the winding disk 431;
  the filler strip 1b is fed, conveying it as far as the entrance of the unit 300 for joining together the master 1a and filler 1b;
  the end of the backing strip is folded manually at right angles and inserted into the notch 431a of the winding disk 431;
  at this point the machine is ready to be started and the gasket automatically produced;
  after spirally winding the first two or three turns of the master 1a;
  welding thereof is performed;
  the filler 1b is fed and joined together with the master 1a forming the strip 1 which is driven by the drive unit, being spirally wound a predetermined number of turns defined for the gasket;
  a further two or more turns of the master 1a alone is performed in order to close the gasket fixed by further welding points;
  winding is continued until the programmed final diameter of the gasket is reached;
B) Winding onto an Inner Ring or Template
  the means for performing feeding of the two strips, i.e. backing strip or master 1a and sealing or filler 1b, are prepared;
  the inner ring or winding template is selected depending on the gasket size to be produced;
  the inner ring or the template is positioned so that the respective circumferential edge rests on a roller of the spindle and on further rollers (not shown) so as to ensure the stability thereof both in the vertical direction and in the longitudinal and transverse directions;
  the driving unit 500 is positioned so that the associated rollers 520a,520b come into contact with a circumferential rim of the inner ring or template and cause rotation thereof;
  the strip joining, feeding and winding sequence described above is repeated;
  once winding has been completed the gasket with its inner ring incorporated is unloaded or the gasket is removed from the template which is ready for a new winding operation.

In all the winding situations the device 435 for moving the spindle unit 400 in the transverse direction Y-Y, during winding, translates so as to displace the axis of rotation of the spindle and therefore the centre of rotation upon variation in the size of the gasket to be produced.

In the case of winding onto an inner ring or template the driving unit 500, which is connected to the plate 435, modifies its position together with the spindle so as to keep constant the contact with the template or the inner ring by means of the rollers 520a,520b, and therefore the driving action, upon variation in the diameter of the gasket during winding.

It is therefore clear how with the machine according to the invention it is possible to obtain coiled gaskets both with a small diameter of between a few tens of mm and 500 mm, wound onto a disk fixed to the spindle, and with diameters greater than 500 mm and up to 4 m, formed on a winding ring (template) or inner ring.

After the first operation of feeding the master and filler strips to the machine, formation of the gaskets is performed by means of a completely automatic cycle which does not require or allow intervention of the operator during operation of the machine, eliminating in this way any risk of injury, this characterizing instead the manually operated machines.

In addition, the high degree of automation offers a greater reliability, repeatability and production speed with a consequent reduction in the downtime due to continuous retooling necessary for the machines of the known type when there is a variation in the diameters of the gaskets.

The machine according to the invention ensures moreover a better quality of formation of the welds obtained also owing to the guide means which ensure that the master 1a, the filler 1b and the combined strip 1 are always guided, thus preventing them from deviating in the transverse direction and ensuring a better planarity of the finished gasket, improving in this way the final characteristics thereof.

Although described in connection with a number of embodiments and a number of preferred examples of implementation of the invention, it is understood that the apparatus may be used also in sectors other than the gasket production sector and that the scope of protection of the present patent is determined solely by the claims below.

The invention claimed is:

1. Machine (10) for the production of coiled gaskets from a continuous master backing strip (1a) and a sealing filler strip (1b), which strips are to be spirally wound onto rings, templates or inner rings (11), the machine comprising at least:
   means (2) for feeding the strips (1a, 1b) to be wound,
   a unit (100) for straightening and forming the master backing strip (1a),
   a unit (200) for making incisions in and cutting the master backing strip (1a), arranged downstream of the straightening and forming unit (100),
   a unit (300) for joining together the master backing strip (1a) and filler strip (1b) so as to form a combined strip (1) and for cutting the filler strip (1b),
   a spindle unit (400) arranged downstream of the strip joining unit (300) and able to be rotationally operated by means of a gearmotor (421b) for winding the combined strip (1) until a predefined maximum diameter of the gasket is reached;
   wherein the combined strip (1) when inside the machine (10) has a longitudinal axis, the machine (10) further comprising:
   a device (435) for moving the spindle unit (400) in a direction that is transverse with respect to the longitudinal axis (Y-Y), and
   a unit (500) for rotationally driving one of the templates or one of the inner-rings (11), which rotational driving unit (500) is arranged downstream of the spindle unit (400) and is mounted on the said device (435) for moving the spindle unit (400) in the transverse direction (Y-Y), so as to form gaskets with a diameter greater than the predefined maximum diameter, and
   a unit (600) for welding the master backing strip (1a),
   said units being designed to produce automatically and in sequence a finished one of the gaskets, in accordance with a program managed by means (1000) for programming, controlling and actuating operations of the units.

2. Machine according to claim 1, characterized in that said unit (100) for straightening and forming the master backing strip (1a) comprises:
   a plurality of vertical-axis pulleys (101) arranged parallel to the longitudinal direction (X-X) and staggered relative to each other in the transverse direction (Y-Y) so as to be arranged alternately on opposite sides of the master backing strip (1a) and designed to guide and straighten the master backing strip during its feeding movement inside the machine;
   a pair (120) of forming disks comprising a first idle roller (121) and a second roller (122) which are motor-driven, the pair (120) of forming disks provided with a manual operating handle (125), said rollers being arranged on opposite sides of the master backing strip (1a) in the transverse direction (Y-Y);
   wherein the two disks each have a respective relief (122a) or recess (121a) with complementary cross-sections and dimensions, able to be clamped together on opposite sides of the master backing strip so as to give the master backing strip a desired form, the straightening and forming unit being designed to perform:
      driving movement for feeding the master backing strip after cutting so as to position its end in front of the winding spindle unit;
      exerting of a torque in the opposite direction to movement of the spindle unit so as to adjust the tension of the master backing strip during winding; and
      measuring of the length of the master backing strip (1a) during winding.

3. Machine according to claim 2, characterized in that two of the pulleys (101) are mounted on respective support blocks (102) that are movable upon operation of means (103) for adjusting a position of the support blocks, and the two disks are each fixed to a respective associated support, one (123) of which is movable.

4. Machine according to claim 1, characterized in that said unit (200) for making incisions in and cutting the master backing strip (1a) comprises a first fixed half-die (210), and a second half-die (211) movable parallel to the transverse direction (Y-Y), said half-dies being respectively provided with complementary: (a) male and female elements (210a, 211a) designed to form a notch (2a) on an edge of the master backing strip (1a), (b) elements (210b, 211b) which make an incision (2b) in the master backing strip and (c) elements (210c, 211c) which perform cutting (2c) of the master backing strip (1a).

5. Machine according to claim 1, characterized in that said unit (300) for joining together the master backing strip (1a) and the sealing filler strip (1b) and for cutting the master backing strip (1a) is arranged downstream of the incision unit (200), and comprises:
   a bearing (310) having an axis parallel to a vertical axis (Z-Z), movable in the transverse direction (Y-Y) and able to generate a thrusting force in the same transverse direction (Y-Y) so as to perform joining together of the sealing filler strip (1b) and the master backing strip (1a), forming the combined strip (1), and a die (321) with a blade (322) mounted on a slide (323) able to be displaced along the transverse direction (Y-Y) so as to allow cutting of the sealing filler strip (1*b*) alone.

6. Machine according to claim 1, characterized in that said spindle unit (400) for winding the combined strip (1) comprises a cylindrical base (410) which is fastened to said device (435) for moving the spindle unit (400) in the transverse direction (Y-Y), the device for moving the spindle unit (400) having, fixed thereon, a free end of a rod (436*a*) of a cylinder (436), a longitudinal axis of the cylinder (436) is also transverse, and a sleeve of the cylinder is positioned on a slide (435*a*) which can be displaceably actuated by means of a controlled drive system in order to displace an axis of rotation of the spindle unit and therefore the centre of rotation of the spindle unit upon variation in the size of the gasket during winding thereof.

7. Machine according to claim 6, characterized in that the base (410) has, positioned thereon, a device (420) with self-centering jaws (421) which can be actuated by an underlying cylinder (421*a*) and are designed to retain corresponding protrusions (431*b*) of a support shank (431*c*) of a winding disk (431) which has an incision (431*a*) for inserting one end of the combined strip (1) to be wound.

8. Machine according to claim 7, characterized in that the spindle unit comprises a vertical-axis counter-thrust roller (435*b*) situated opposite, in the transverse direction (Y-Y), to the winding disk (431) and movable, from a rest position, removed from said disk, to a working position, close to the winding disk (431), so as to ensure relative tangential contact.

9. Machine according to claim 1, characterized in that said unit (500) for driving one of the templates or one of the inner-rings (11) is fixed on the spindle unit movement device (435) and comprises a support block (510) to which two horizontal-axis rollers (520) are fixed, said rollers being aligned one on top of the other one in the vertical direction (Z-Z) and being rotationally moved by a gearmotor (530) so as to engage with friction on the one template or the one inner ring and cause rotation thereof in an anti-clockwise direction.

10. Machine according to claim 1, characterized in that said rotational driving unit (500) has a fulcrum (540) for rotation of the rotational driving unit (500) relative to a support plate of the spindle unit (400), which fulcrum (540) is designed to allow rotation of said rotational driving unit with respect to the plate and to maintain the relative orientation of the gasket and rollers driving the one of the templates or the one of the inner rings (11) when there is a variation in dimensions of the gasket.

11. Machine according to claim 1, characterized in that said welding unit (600) comprises a laser device (610), an emission head (610*a*) of which is arranged so as to weld the gasket being formed.

12. Machine according to claim 11, characterized in that said laser device (610) is mounted on a support (611) designed to allow displacement of the welding unit from a parked position into a working position and allow rotation of an end part of the laser device.

13. Machine according to claim 12, characterized in that said rotation of the end part of the laser device is controlled by the programming, control and actuating means (1000) so as to adapt the position of the laser device to variation in a diameter of the gasket being formed.

14. Machine according to claim 9, wherein the two horizontal-axis rollers (520) comprise a stationary bottom roller (520*a*) and a movable upper roller (520*b*).

\* \* \* \* \*